United States Patent [19]
Moore

[11] Patent Number: 5,475,846
[45] Date of Patent: Dec. 12, 1995

[54] APPARATUS FOR PROCESSING PCMCIA INTERRUPT REQUESTS

[75] Inventor: Terrill M. Moore, Trumansburg, N.Y.

[73] Assignee: Databook Incorporated, Ithaca, N.Y.

[21] Appl. No.: 105,860

[22] Filed: Aug. 11, 1993

[51] Int. Cl.⁶ ..................................................... G06F 13/14
[52] U.S. Cl. ........................................... 395/733; 395/442
[58] Field of Search .............................................. 395/725

[56] References Cited

U.S. PATENT DOCUMENTS

| | | | |
|---|---|---|---|
| 4,631,670 | 12/1986 | Bradley et al. | 395/725 |
| 5,101,497 | 3/1992 | Culley et al. | 395/725 |
| 5,261,107 | 11/1993 | Klim et al. | 395/725 |
| 5,280,618 | 1/1994 | Takagi | 395/725 |

*Primary Examiner*—Jack B. Harvey
*Assistant Examiner*—Xuong M. Chung-Trans
*Attorney, Agent, or Firm*—Nixon, Hargrave, Devans & Doyle

[57] ABSTRACT

An apparatus to permit the sharing of interrupts between resident devices and removable PCMCIA peripherals overcomes a deficiency in the PCMCIA standards. By permitting interrupt sharing, the apparatus allows standard application software, which assumes the interrupt sharing capability of standard built-in peripherals to operate with PCMCIA cards. The invention is particularly suited to serial communication ports, where interrupts are routinely shared. An interface component 20 is coupled to an interrupt controller 12. A serial port COM1 is connected to a host interrupt IRQ4, which is shared by a PCMCIA card serial port 22, configured as COM3, through the interface controller 20. Through the use of an open-drain output and a conversion in the controller 20 of the level mode interrupt from the PCMCIA card to a low-going pulse of sufficient voltage swing and duration, the host interrupt is shared between the permanently installed COM1 and the removable COM3 serial ports.

9 Claims, 2 Drawing Sheets

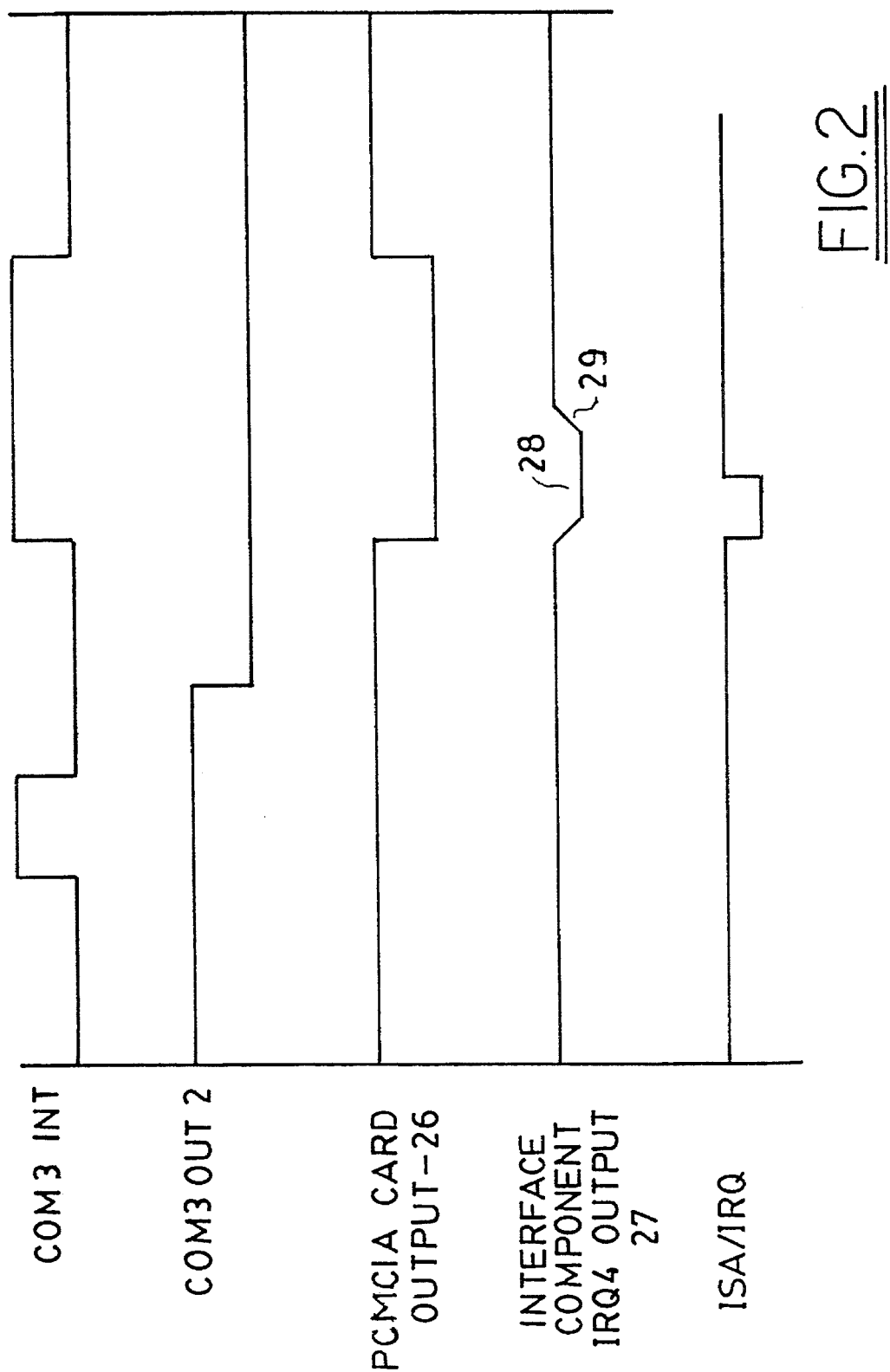

APPARATUS FOR PROCESSING PCMCIA INTERRUPT REQUESTS

FIELD OF THE INVENTION

This invention relates to an apparatus for processing interrupts and, more particularly, to an apparatus for processing Personal Computer Memory Card International Association ("PCMCIA") interrupt requests.

BACKGROUND OF THE INVENTION

In a computer system, interrupts are used to signal the microprocessor, without having the microprocessor systematically checking each peripheral. Asynchronous peripheral devices coupled to the processor generate an interrupt signal when they wish to communicate with the microprocessor. The interrupt signal can be acted upon by the microprocessor following the execution of any instruction, if interrupt events of the type occurring are enabled. If an interrupt signal is received, the microprocessor stores the program counter and other state information prior to transferring control to the interrupt service program. The service program is then executed by the microprocessor. When the service program terminates, the microprocessor restores its previous state and resumes executing the original program.

In the case of the PCMCIA expansion socket, commonly found on, but not limited to, notebook PCs, a single interrupt pin is available from the card inserted into the socket. Typically, the host interface controller has the capability to route that interrupt request to one of a plurality of interrupts available in the PC. The selection process is based on the hardware resources available in the system, and the requirements of the card-specific driver and host computer operating system. In normal operation, this process is performed automatically by the system, after card insertion has been detected and a determination made based on the above parameters.

Because of the variety of cards which may be inserted into the PCMCIA socket, and their varying requirements, and due to a lack of prior knowledge of what other cards may already be inserted into such a system, the card support software is typically designed to be able to operate with any of a variety of interrupts which may be provided to it by the card installation software. However, limitations in the PC hardware and operating system architecture may dictate that a particular interrupt must be shared by two peripherals.

A common type of PCMCIA card implements a serial communication port. Often, these cards will also be equipped with Modem and/or Fax capabilities. Serial communication ports (including Modems and Faxes) in the PC environment are referred to as COM ports. The n-th COM port is designated COMn. Frequently, a PCMCIA card carrying a serial communication port will be configured by the installation software to appear exactly as such a function would appear were it installed permanently on the computer motherboard, or in an internal expansion bus slot. Peripherals configured as such can then be operated by existing software, which expects the hardware to appear at rigidly defined addresses, and to manifest a well defined set of properties, including the use of specific interrupts in a defined and standardized manner, including the ability to share a single interrupt. The nth interrupt request line is designated IRQn in PC systems.

In the case of an on-motherboard or expansion-slot based peripheral, typically each device is coupled to an IRQ using a three-state buffer. The outputs of the three-state buffers are coupled to an interrupt controller; the output of the interrupt controller is coupled to the microprocessor. Usually, two COM ports will share a common IRQ line. For example, COM1 and COM3 usually share the same IRQ line to the interrupt controller. Software determines whether COM1 or COM3 will be able to generate an interrupt. If COM1 is selected, than the three-state buffer coupled to COM1 is enabled and COM1 is able to generate an interrupt signal to the interrupt controller, while the three-state buffer coupled to COM3 will remain in a high impedance state. The interrupt controller receives the signals and transmits them to the microprocessor. The IRQ lines are edge sensitive.

A deficiency in the PCMCIA specification has caused problems with the traditional operation of shared interrupts. PCMCIA defines a standard for ports and cards which allows a variety of different peripheral cards to be plugged into the ports for use with the computer system. An interface component is coupled between the port and the microprocessor to control the interaction between the devices. The COM port is located on the PCMCIA card with the three-state buffer. The output from the three-state buffer is fed to the interface component. However, the enable signal, derived in the COM-port-equipped PCMCIA card is never transmitted to the interface component, preventing the use of a three-state buffer within the interlace component. As a result, in a strictly PCMCIA compliant system, whenever a PCMCIA card is plugged into the peripheral port, the assigned host computer IRQ line may be driven by the PCMCIA interface controller as requested by the card, and the other COM port sharing the interrupt line may be, and, in fact, is typically completely prevented from using that interrupt line.

Accordingly, it is a general object of the present invention to provide an apparatus for processing PCMCIA interrupt requests in a manner which allows host IRQs to be shared between multiple PCMCIA cards, as well as between PCMCIA cards and peripherals permanently resident in a system.

SUMMARY OF THE INVENTION

According to the present invention, these and other objects and advantages are achieved in a computer system which includes a microprocessor, an interrupt controller, a first serial port peripheral device, a pull-up resistor, and an interface component. The interrupt controller is coupled to the microprocessor and to the first serial port and has a first host interrupt request input. The first serial port is coupled to the first host interrupt request input and the peripheral device. The pull-up resistor is coupled between the first host interrupt request input and a power source. The interface component is coupled between a peripheral port and the first host interrupt request input. The peripheral port is capable of receiving a peripheral device. Preferably the peripheral port and device are in compliance with PCMCIA Standards. The first host interrupt request input remains in a high impedance state until either the first serial port or the peripheral interface component generates an interrupt request. When the interface component receives an interrupt signal from the inserted card, it drives the first host interrupt request input low and then high to trigger an interrupt signal for the microprocessor.

With the invention, a deficiency in the PCMCIA specification for processing the interrupt request is overcome. Specifically, peripheral devices coupled to PCMCIA peripheral ports were previously coupled to an interface component which was then coupled to a shared interrupt line. The output of the interface component remained in an active state, whether or not an interrupt was currently being requested. As a result, the other COM port which attempted to share the interrupt line was unable to generate an interrupt to the microprocessor. With the invention, the interface component is able to share an interrupt line with another serial port.

BRIEF DESCRIPTION OF THE DRAWINGS

For a better understanding of the present invention, together with other and further objects, advantages and capabilities thereof, references are made to the accompanying drawings, which are incorporated herein by reference and in which:

FIG. 2 is a timing diagram for interrupt request signals.

DETAILED DESCRIPTION OF THE INVENTION

Figure 1:
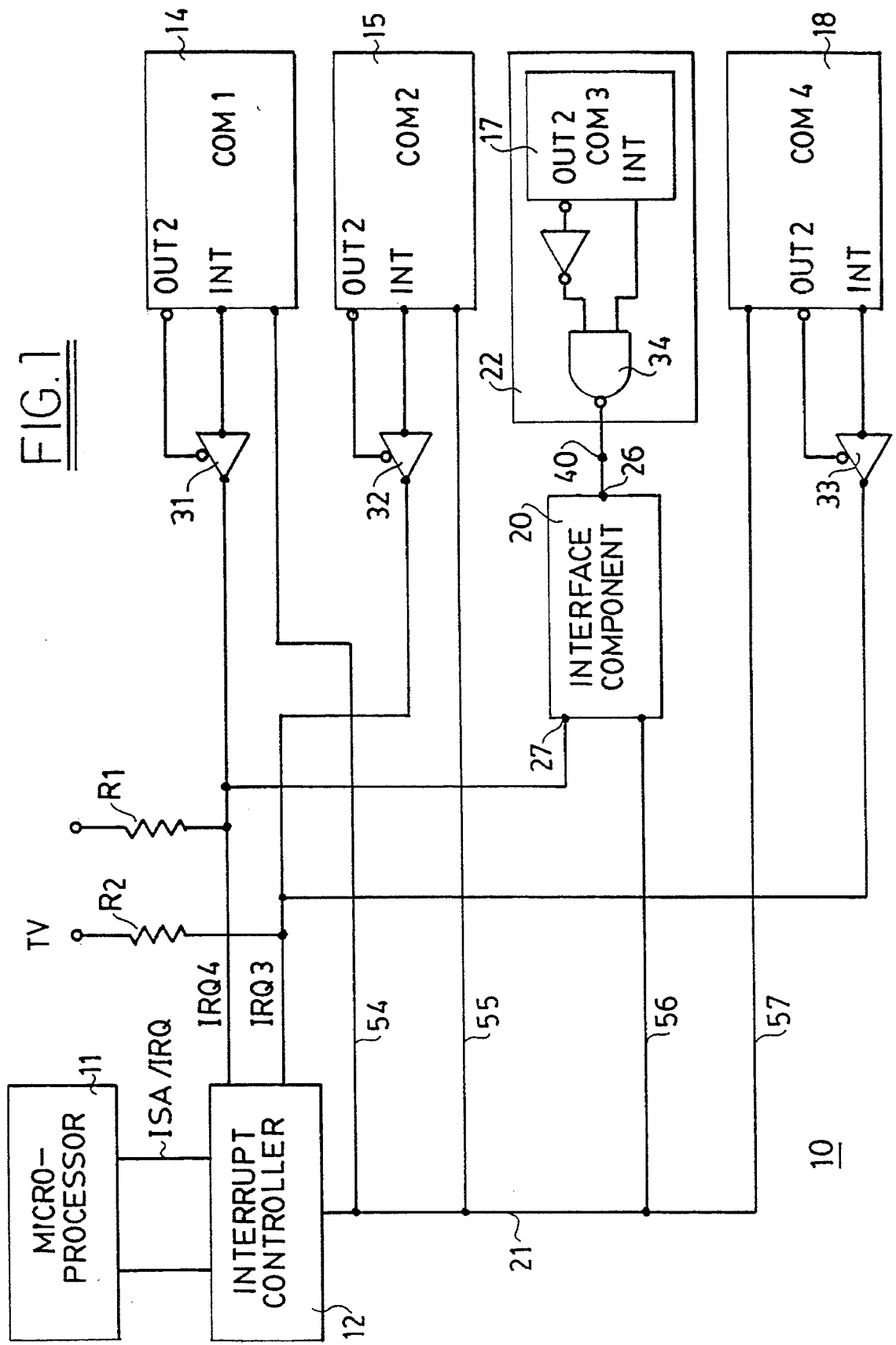
FIG. 1 is a block diagram of the computer system with the apparatus for processing PCMCIA Interrupt Requests in accordance with the present invention.

An apparatus 10 for processing PCMCIA interrupt requests in accordance with the present invention is illustrated in FIG. 1. The apparatus includes a microprocessor 11, an interrupt controller 12, a first serial port 14, a pull-up resistor $R_1$, and an interface component 20. With the apparatus 10, a computer system is able to process interrupt requests from a serial port 14, and an interface component 20 which share a common interrupt request line IRQ4.

Referring to FIG. 1, the microprocessor 11 is coupled to the interrupt controller 20 by an ISA or similar system bus 21. Preferably, the microprocessor 11 is an Intel 486SX or a 486DX, or an equivalent from another manufacturer such as AMD or Cyrix. The bus 21 is coupled to the interface component 20 and to COM1, COM2, and COM4. COM1, COM2, and COM4 are serial ports, such as 8250 serial ports. Typically, the serial ports 14, 15, 18 operate in accordance with RS-232 protocols and levels. Each COM port includes an OUT 2 signal which is a three-state buffer enable, and an interrupt INT output. The interrupt controller includes IRQ4 and IRQ3 input lines. The INT output from each COM port 14, 15, 18 is coupled to the input of a three-state buffer 31, 32, 33. The OUT 2 output is coupled to the three-state buffer enable. The output of the three-state buffer 31 for COM1 is coupled to IRQ 4 and the interface component is coupled to IRQ 4. Similarly, the output of the three-state buffers 32, 33 for COM2 and COM4, respectively, are coupled to IRQ3.

A peripheral port 16 is coupled to the interface component 20. Although only one peripheral port 16 is shown, more than one peripheral port may be coupled to the interface component 20, and multiple interface components 20 may be used in a single system. The peripheral port 16 is capable of receiving a peripheral device 22. Preferably, the peripheral devices 22 are in compliance with PCMCIA Standards. The peripheral device 22 typically will include a COM port 17 with an INT and OUT 2 output. The INT output and the OUT 2 output are coupled to the inputs of a NAND gate 34. The output of the NAND gate 34, signal 40 or -CARDIRQ, is coupled through the peripheral port 16 to the interface component 20. In effect, both the OUT 2 output and the INT output must be true in order for signal 40 to be true. Note that whereas IRQ3 and IRQ4 are high-true signals, -CARDIRQ is low-true. The operation of a standard serial port configuration will be shown with COM2 and COM4.

Interrupt controller 12 is a well-known device. It is coupled to ISA or equivalent bus 21 and processes interrupt requests received via request lines IRQ3, IRQ4. An application program or other suitable means provides the microprocessor with an address of one of the serial ports 14–16. Upon receipt of that instruction, microprocessor 11 issues a command on ISA or equivalent bus 21. This command is received via the serial port control lines 54, 55, 56, 57. Each control line is coupled to an 8250 serial port controller or similar circuit which controls the enable line (OUT 2) of the three-state buffers 31, 32 and 33 on the corresponding serial port. In effect, the application software sets a bit in the serial port controller that either enables or disables the three-state buffers 31, 32 and 33. Only one buffer of the two three-state buffers on an interrupt request line is enabled at any given time. COM2 and COM4 share interrupt request line IRQ3, so either OUT 2 of COM2 or COM4 will enable respective three-state buffer 32, 33. When one of the three-state buffers 32, 33 is enabled, the output of INT for that particular serial port will pass through the buffer to the IRQ3 line. The interrupt controller 12 is edge-sensitive to signals on lines IRQ3 and IRQ4. Accordingly, when the INT lines through the three-state buffer (32 or 33) switches from low to high an interrupt request for that serial port will be triggered. The interrupt controller 12 will signal the microprocessor 11 that one of the COM ports (15 or 18) has requested an interrupt; application software, knowing which COM port it has enabled, can unambiguously determine the source of the interrupt.

The microprocessor 11 receives an interrupt instruction from interrupt controller 12. Upon execution of the interrupt instruction, the microprocessor 11 enters an interrupt response sequence, which results in saving its state and in execution of a service routine for the interrupting peripheral device. The microprocessor 11 then executes the program for the particular peripheral device and upon completion, returns to the original program, restores its state and resumes execution.

It will be recalled that output 27 of interface component 20 is connected to IRQ4. Thus, any interrupt signals from the PCMCIA card 22 must pass through component 20 to IRQ 4. However, the output 27 of component 20 is not directly controlled by the COM port installed in peripheral port 16. Although it is a three-state output, it cannot be placed in a high-impedance state by signal OUT 2 of serial interface 17, because signal OUT 2 is not available on the PCMCIA interface. However, because output 27 is an open-drain output, it is pulled-up to its inactive state (with IRQ4 at a logic high level) by pull-up resistor $R_1$. Another consequence of output 27 being open-drain is that, when it is inactive, it will not interfere with COM1 asserting a logic low level to indicate that it wishes to interrupt. Thus, sharing of IRQ4 is provided for. When an interrupt signal is received by component 20 from card 22, a logic sequencer (not shown) in interface component 20 provides a low-going pulse, achieving a conversion of the output interrupt logic level asserted by the card 22 to a pulse.

The sequence of events associated with an interrupt from COM3 is as follows. Prior to generation of an interrupt signal at INT of COM3, the NAND gate 34 is enabled by the OUT 2 signal of COM3 going to logic low; and the PCMCIA interface component 20 is instructed to pass card interrupts to IRQ4. At that time, the PCMCIA interface component keeps its output driver for pin 27 in a high-impedance state; and the pull-up resistor R1 causes IRQ4 to be held high. The active-high INT output of COM3 causes signal 40, -CARDIRQ, to be driven low, signaling an interrupt to the PCMCIA interface. Upon receipt of the IRQ level at input 26, the PCMCIA interface component 20 processes that low input to a low-going pulse on its output 27, which is coupled to IRQ4. The pulse 28 as shown on FIG. 2 is formed by actively driving output 27 to ground, and then returning output 27 to a high-impedance state. Thus, it is sufficient to provide a rising edge 29 that is sensed by interrupt controller 12. Thereupon, controller 12 issues an interrupt command to microprocessor 11. The microprocessor 11 then communicates with the PCMCIA card via ISA or similar bus 21 and interface component 20 in a manner well-known in the art.

The interface component 20, coupled to the COM3 port and the COM1 port share interrupt request line IRQ4. Software in the application program run by microprocessor 11 controls whether COM1 or COM3 is enabled. When COM3 is enabled, COM3 OUT 2 will enable the NAND gate 34 and the output of INT from COM3 will be passed to the interface controller 20. Specifically, in FIG. 2, the output from the PCMCIA card 26 goes low when the COM3 INT output goes high when the COM3 OUT 2 is low. At that time the output from the PCMCIA card is transmitted to the interface component 20 which, upon receipt, drives a low-going pulse of predetermined duration on the interrupt request line IRQ 4 of sufficient voltage swing to ensure that the trailing edge of the pulse triggers an interrupt request for the PCMCIA card. The output 27 of the interface component is effectively of the open-drain type, so it does not interfere with the ability of COM1 to generate its standard level interrupt when it is inactive.

With the present invention, PCMCIA interrupt request can be transparently handled by the computer system without any further modifications. The system enables standard software packages to be used with the system.

Having thus described the basic concept of the invention, it will be readily apparent to those skilled in the art that the foregoing detailed disclosure is intended to be presented by way of example only, and is not limiting. Various alterations, improvements and modifications will occur and are intended to those skilled in the art, though not expressly stated herein. These modifications, alterations and improvements are intended to be suggested hereby, and are within the spirit and scope of the invention. Accordingly, the invention is limited only by the following claims and equivalents thereto.

What is claimed is:

1. A computer system comprising:

a microprocessor;

an interrupt controller coupled to said microprocessor, said interrupt controller having at least a first interrupt request input;

a pull-up resistor coupled between a power source and said first interrupt request input;

first serial port means having a first output coupled to said first interrupt request input and a first peripheral port input coupled to a first peripheral device, said first serial port means when enabled outputting a first non-interrupt state on said first output until a first interrupt request is received from said first peripheral device and then outputting a first interrupt state on said first output and said first serial port means when disabled outputting a first high impedance state on said first output; and second serial port means having a second output coupled to an interface component and a second peripheral port input coupled to a second peripheral device, said second serial port means when enabled outputting a second non-interrupt state on said second output until a second interrupt request is received from said second peripheral device and then outputting a second interrupt state on said second output and said second serial port when disabled outputting a second high impedance state on said second output; and said interface component having an interface output coupled to said first interrupt request input, said interface component outputting a third high impedance state when said interface output receives said second non-interrupt state or said second high impedance state and outputting a third interrupt state when said interface component receives a second interrupt state and said first serial port is disabled.

2. The computer system according to claim 1 wherein said first serial port means further comprises a first tristate buffer having a first buffer output coupled to said first interrupt request input and a first buffer input coupled to a first serial port, said first serial port coupled to said first peripheral device and said second serial port means comprises a second tristate buffer having a second buffer output coupled to said interface component and a second buffer input coupled to a second serial port, said second serial port coupled to said second peripheral device.

3. The computer system according to claim 2 wherein said interface output is an open-drain output.

4. The computer system according to claim 2 wherein said second peripheral device is in compliance with Personal Computer Memory Card International Association/Japanese Electronic Industry Development Association standards.

5. The computer system according to claim 2 further comprising a bus coupled to said interface component and said first serial port, said bus providing a control signal which either enables or disables said first tristate buffer.

6. The computer system according to claim 1 wherein said interface output is an open-drain output.

7. The computer system according to claim 6 wherein said second peripheral device is in compliance with Personal Computer Memory Card International Association/Japanese Electronic Industry Development Association standards.

8. The computer system according to claim 6 further comprising a bus coupled to said interface component and said first serial port, said bus providing a control signal which either enables or disables said first tristate buffer.

9. The computer system according to claim 1 further comprising a bus coupled to said interface component and said first serial port means, said bus providing a control signal which either enables or disables said first serial port means.

* * * * *